United States Patent
Webster et al.

(10) Patent No.: US 12,045,576 B1
(45) Date of Patent: Jul. 23, 2024

(54) SYSTEMS AND METHODS FOR PROCESSING DATA

(71) Applicant: NLP Logix, LLC, Jacksonville, FL (US)

(72) Inventors: Benjamin Webster, Jacksonville, FL (US); Austin Seymour, Jacksonville, FL (US)

(*) Notice: Subject to any disclaimer, the term of this patent is extended or adjusted under 35 U.S.C. 154(b) by 0 days.

(21) Appl. No.: 18/383,463

(22) Filed: Oct. 24, 2023

(51) Int. Cl.
*G06F 16/31* (2019.01)
*G06F 40/279* (2020.01)
*G06F 40/30* (2020.01)

(52) U.S. Cl.
CPC .......... *G06F 40/30* (2020.01); *G06F 40/279* (2020.01)

(58) Field of Classification Search
CPC ....... G06F 16/31; G06F 16/33; G06F 16/3329
See application file for complete search history.

(56) References Cited

U.S. PATENT DOCUMENTS

| | | | | |
|---|---|---|---|---|
| 7,716,207 B2* | 5/2010 | Odom | ............ | G06F 16/313 707/723 |
| 8,335,787 B2* | 12/2012 | Shein | ............ | G06F 16/355 707/750 |
| 9,400,779 B2 | 7/2016 | Convertino et al. | | |
| 11,645,449 B1 | 5/2023 | Ritchie et al. | | |
| 2005/0108200 A1* | 5/2005 | Meik | ............ | G06F 16/954 |
| 2013/0218914 A1 | 8/2013 | Stavrianou et al. | | |
| 2015/0081277 A1* | 3/2015 | Behi | ............ | G06F 40/205 704/9 |
| 2021/0103865 A1* | 4/2021 | Anisingaraju | ........ | G06F 16/367 |

* cited by examiner

*Primary Examiner* — Daniel Abebe
(74) *Attorney, Agent, or Firm* — Wilson Dutra, PLLC; Camille A. Wilson

(57) ABSTRACT

The present disclosure provides for systems and methods for processing data. In some aspects, a data processing system may comprise at least one computing device, wherein the computing device may be configured to facilitate the performance of at least one process for extracting one or more domain-specific topics or themes from at least one data set. In some implementations, one or more data sets may be received by the data processing system such that the data processing system may identify one or more n-grams within each data item. In some embodiments, one or more of the n-grams may identified as being potentially associated with a correlating topic or theme such that data items comprising the same or similar n-grans may be aggregated into the same topic or theme, thereby assisting a user with quickly locating desirable data items within the data set.

20 Claims, 6 Drawing Sheets

300

| Theme Frequency and Sentiment | Ngram Frequency and Sentiment |

305 → ← 310

Sentence Detail with Sentiment

| Session | Theme | |
|---|---|---|
| 003285 | Customer Service | |
| 009514 | Customer Service | | ← 315

| Theme Frequency and Sentiment | Ngram Frequency and Sentiment |

306 → ← 311

Sentence Detail with Sentiment

| Session | Theme | |
|---|---|---|
| 005916 | Food Quality | "Pizza wasn't very tasty" | ← 316

SYSTEMS AND METHODS FOR PROCESSING DATA

BACKGROUND

Feedback is the process of communicating corrective or evaluative information about performance, events, and processes. Typically, feedback is offered with the intention to improve overall performance or quality of the relevant subject matter. Businesses invest both time and financial resources to develop and improve channels of feedback for consumers. Such feedback is highly valuable as it enables a business to fine tune its available goods and services to provide a better overall customer experience.

There are many means via which a business or other organization can receive feedback. These include, but are not limited to, surveys, online reviews and ratings, direct communication with customers, and social media interaction. While the feedback received from these methodologies is helpful, it can be very difficult to properly search through and understand in a manner efficient enough to allow for timely responses or corrective measures to be developed. As technology continues to evolve, more efficient ways to receive and interpret feedback have become available.

Artificial Intelligence ("AI") is the development of technology that performs tasks that typically require human intelligence. At enables machines to have the capability to make decisions, comprehend data, and mimic other human abilities. AI technology is driven by algorithms, step-by-step instructions on how and when the machine should operate and how the machine can learn to operate on its own. Like the human brain, AI learns from the information that it processes, with an AI program or model developing as it is trained with proper data via machine learning.

A subdivision of AI, machine learning is the practice of using algorithms that dissect data and learn from it to make predictions. As a machine learning system receives and digests more information, the accuracy of its predictions increases, and so the importance of continuously exposing the system to new data is hard to understate. Machine learning pipelines exist to streamline the process of training an AI model by automating the process via which the model receives data.

Machine learning systems have been used to find common trends and themes among data sets. For example, machine learning can be utilized to sort through feedback data to identify themes within the data using one or more clustering algorithms. However, the technology is very limited as many of the themes identified by the trained AI model are irrelevant or are not useful to a user's objectives.

SUMMARY OF THE DISCLOSURE

What is needed are systems and methods for processing data. In some aspects, the present disclosure provides for a method for extracting one or more domain-specific topics from at least one data set. In some implementations, the method may comprise receiving at least one data set from at least one data source, wherein the at least one data set may comprise at least one data item that comprises at least one datum; identifying a first set one or more n-grams within the data set; presenting the first set of n-grams to at least one user; receiving at least one selection from the user of at least one of the n-grams; and generating at least one topic for the data set based at least partially on the received user selection.

A number of embodiments of the present disclosure will be described. While this specification contains many specific implementation details, these should not be construed as limitations on the scope of any disclosures or of what may be claimed, but rather as descriptions of features specific to particular embodiments of the present disclosure. It is understood to those skilled in the art that variations, modifications, and alterations may be apparent. It will be understood that various modifications may be made without departing from the spirit and scope of the disclosure.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 3A illustrates an exemplary user interface generated by a data processing system, according to some embodiments of the present disclosure.

FIG. 3B illustrates an exemplary exemplary user interface generated by a data processing system, according to some embodiments of the present disclosure.

DETAILED DESCRIPTION

Figure 1:
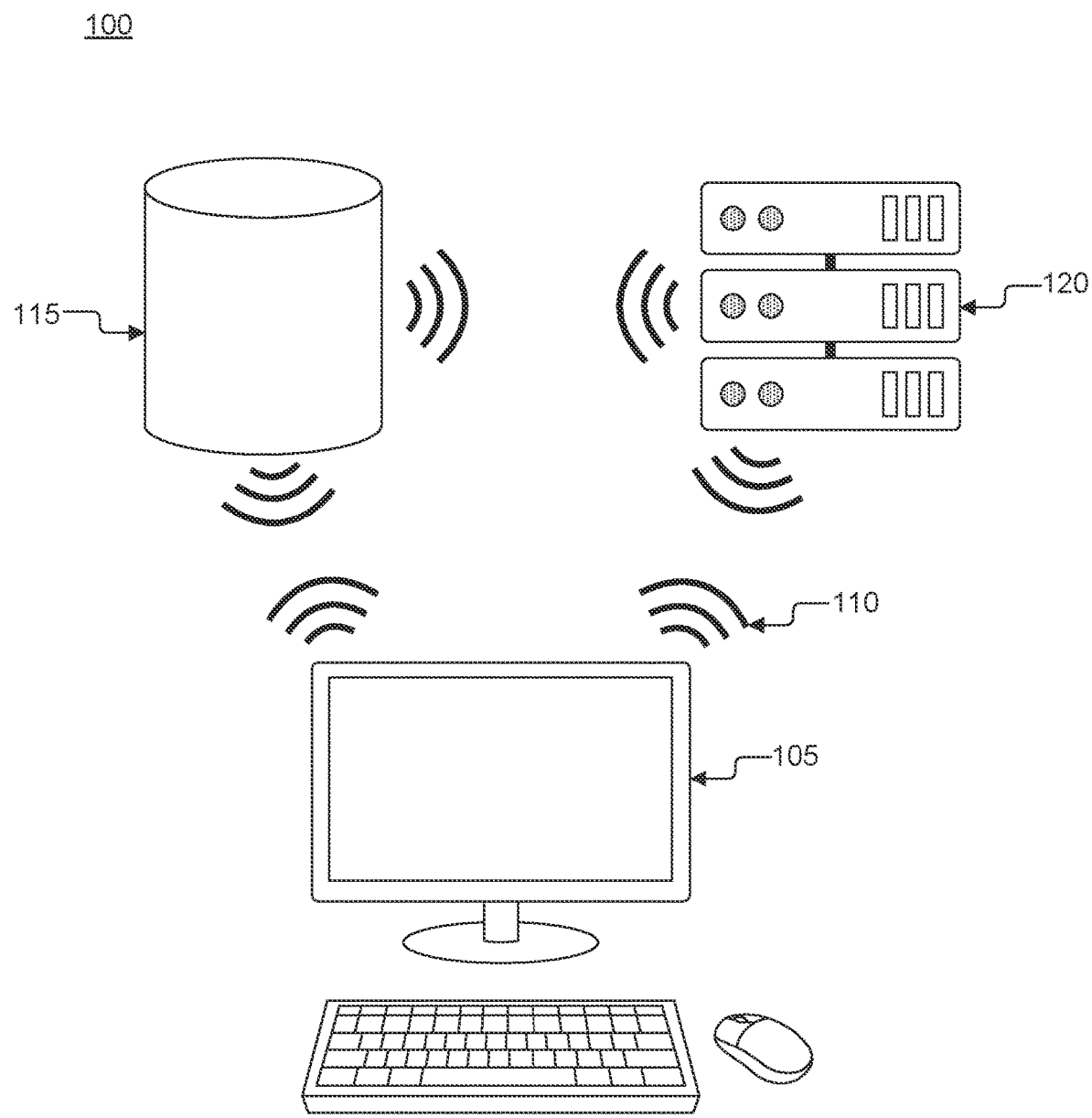
FIG. 1 illustrates an exemplary data processing system, according to some embodiments of the present disclosure.

The present disclosure provides generally for systems and methods for facilitating data processing. According to the present disclosure, a data processing system may comprise at least one computing device that comprises at least one storage medium and at least one processing device. In some aspects, the storage medium may comprise one or more coded instructions or algorithms that may be accessed and executed by the processing device to cause the processing device to perform one or more functions or operations that may facilitate processing of at least one data set received from at least one data source. In some implementations, processing a data set may at least partially comprise parsing one or more portions of the data set to identify one or more n-grams, wherein each n-gram may be potentially related to at least one theme, category, topic, or similar grouping of data set items that may share at least one common aspect or element.

In some embodiments, the data processing system of the present disclosure may at least partially comprise at least one artificial intelligence infrastructure. In some implementations, the artificial intelligence infrastructure may be configured to be trained by at least one machine learning process or algorithm. In some aspects, the machine learning process may comprise an unsupervised machine learning process that may be supplemented by one or more types of user input, feedback, or alterations. In some embodiments, this may facilitate the generation of data grouping(s) that may be most relevant or useful to the user's needs or objectives.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Artificial intelligence infrastructure: as used herein refers to any electronic or computing system configured to execute or perform one or more machine learning or artificial intelligence algorithms, processes, operations, functions, or calculations. By way of example and not limitation, an artificial intelligence infrastructure may comprise a neural network, a deep neural network, or a support-vector machine.

N-gram: as used herein refers to a collection or grouping of any number of successive elements within a textual unit. By way of example and not limitation, an n-gram may comprise one or more of: a letter, a number, a character, a punctuation mark, a word, a symbol, or a phrase, as non-limiting examples.

Data set: as used herein refers to an amount of data received by a data processing system. In some non-limiting exemplary embodiments, a data set may comprise a plurality of textual based comments or similar content from at least one data source.

Data item: as used herein refers to a unit of at least one datum within a data set. By way of example and not limitation, a data item may comprise one text based comment within a plurality of comments or similar messages.

Data source: as used herein refers to any source of at least one datum that may be processed or analyzed by a data processing system. By way of example and not limitation, a data source may comprise a database comprising a plurality of comments or similar natural language or text-based elements.

Domain: as used herein refers to a unique area of information or knowledge that may be relevant or pertinent to at least one data set. By way of example and not limitation, a domain may comprise financial services, healthcare, or pizza delivery, as non-limiting examples.

Referring now to FIG. 1, an exemplary data processing system 100, according to some embodiments of the present disclosure, is illustrated. In some aspects, the data processing system 100 may comprise at least one computing device 105, wherein the computing device 105 may comprise at least one storage medium and at least one processing device. In some implementations, the storage medium may comprise one or more coded instructions or algorithms that may be accessed and executed by the processing device to cause the processing device perform one or more functions or operations upon an amount of data received by or stored within the computing device 105 and/or to cause the processing device to receive and interpret one or more inputs received from at least one user via at least one input device integrated with or communicatively coupled to the computing device 105. By way of example and not limitation, the input device may comprise at least one of: a keyboard, a keypad, a touchscreen, a pointing device (e.g., a mouse), a camera, a microphone, an accelerometer, or a motion sensor, as non-limiting examples.

In some aspects, the data processing system 100 may comprise at least one network connection 110, such as, for example and not limitation, a connection to the global, public Internet or a connection to a local area network ("LAN"), such that the computing device 105 may be configured to access the network connection 110. In some implementations, the data processing system 100 may comprise at least one data source. In some embodiments, the data source may comprise at least one database 115 or any similar component configured to transmit at least one datum to the computing device 105 via the network connection 110. In some embodiments, the data processing system 100 may comprise one or more servers 120. In some aspects, the server(s) 120 may comprise a data source and/or the server(s) 120 may be configured to facilitate transmission of at least one datum from at least one data source to the computing device 105, as non-limiting examples.

In some implementations, the data processing system 100 may comprise at least one artificial intelligence infrastructure. In some embodiments, the artificial intelligence infrastructure may be configured within the computing device 105 or one or more of the servers 120, as non-limiting examples. In some aspects, the artificial intelligence infrastructure may be trained via one or more machine learning algorithms. In some non-limiting exemplary implementations, the artificial intelligence infrastructure may be trained via at least one unsupervised machine learning process.

In some aspects, the artificial intelligence infrastructure of the data processing system 100 may at least partially comprise a neural network or similar configuration that comprises at least one large language model. In some implementations, the large language model may be trained exclusively using data items within a data set that comprises a single domain or two or more substantially similar domains such that the large language model may become configured to identify the relative meaning of words or phrases within the unique context of the relevant domain(s). In some embodiments, this may enable the artificial intelligence infrastructure of the data processing system 100 to provide more relevant or useful outputs to a user.

In some implementations, once the large language model of the artificial intelligence infrastructure of the data processing system 100 is trained to understand the language of the domain(s) of a data set, the artificial intelligence infrastructure may be configured to parse the data set identify common words, phrases, numbers, or similar n-grams that may comprise a relatively high frequency occurrence within the data set. In some aspects, one or more n-grams with a high frequency occurrence may be presented to at least one user of the data processing system 100 via at least one display screen or similar display mechanism integrated with or communicatively coupled to the computing device 105. In some embodiments, this may allow the user to view the n-gram(s) and select one or more of the n-grams that may be interesting to the user or relevant to one or more user objectives or purposes.

In some aspects, upon receiving a selection of one or more n-grams from a user, the artificial intelligence infrastructure of the data processing system 100 may be configured to parse the associated data set again to identify a second set of one or more n-grams that may comprise content, context, or meaning similar to the first set of identified n-gram(s). In some implementations, the second set of n-gram(s) may be presented to the user via the computing device 105 such that the user may be able to affirm or reject the relevance of each n-gram within the second set as being useful or interesting to the user. In some embodiments, this exchange between the user and the artificial intelligence infrastructure may iterate until the artificial intelligence infrastructure identifies one or more topics or themes within the data set that the user deems to be useful, relevant, or interesting.

In some implementations, once one or more themes or topics have been identified or established by the data processing system 100, any new data received by the data processing system 100 that pertains to at least one of the identified topic(s) or theme(s) may be tagged as being within the scope of the relevant theme(s) or topic(s). In some aspects, this may enable a user to quickly find data related to a unique theme or topic so that the user may review the data and, if necessary, perform, initiate, or facilitate one or more actions or responses based on the data in a timely manner.

As a non-limiting illustrative example, the computing device 105 of the data processing system 100 may receive a data set from a data source in the form of a database 115 that comprises a plurality of data items in the form of comments that comprise reviews or feedback for a pizza delivery restaurant. In some aspects, the domain for this data set may comprise "pizza delivery," and as such the large language model of the artificial intelligence infrastructure of the data processing system 100 may develop a basic correlation between words and phrases used within the context of pizza delivery and the meaning of those words and phrases in that context. In some implementations, the artificial intelligence infrastructure may identify one or more words or phrases that are used with a higher frequency than others and present those words or phrases to at least one user for review.

To further illustrate the previous example, the artificial intelligence infrastructure may parse the plurality of pizza delivery comments and identify that the phrases "friendly driver," "hard crust," and "lots of cheese" are used very frequently within the comments. In some embodiments, the data processing system 100 may present these phrases to a user, such as, for example and not limitation, an owner or manager of the pizza delivery restaurant, via the computing device 105. In some implementations, the user may select one or more of these phrases as being relevant or interesting such that the user would like to receive more information from the data set that relates to the selected phrase(s). By way of example and not limitation, the user may be interested in learning more about how customers discuss the ratio of toppings on their pizzas, and so the user may select "lots of cheese" from the list of identified phrases.

In some aspects, upon receiving the user's selection of the phrase "lots of cheese," the artificial intelligence infrastructure may parse the pizza delivery comments at least one additional time to identify words or phrases that may have a similar meaning and/or context as the selected phrase. In some implementations, the phrase "lots of cheese" may be used in the context of describing the amount of cheese on a pizza or the amount of cheese stuck on the pizza box, and so the artificial intelligence infrastructure may identify similar characteristics or aspects of pizza toppings, the condition of the pizza box, or the cheese itself that may be useful, interesting, or relevant to the user. By way of example and not limitation, the artificial intelligence infrastructure may identify the phrases "not enough sauce" and "too many olives" as also relating to pizza toppings, while the phrases "greasy bottom" and "hard to open" may be identified as relating to pizza box conditions, and the phrases "good blend" and "nice consistency" may be identified as relating to the cheese itself.

In some embodiments, the data processing system 100 may present all of the identified phrases to the user via the computing device 105. In some aspects, the user may select the phrases "not enough sauce" and "too many olives" as comprising additional phrases of interest. In some implementations, this selection may cause the artificial intelligence infrastructure to understand that the user is interested in comments pertaining to pizza toppings, and so the artificial intelligence infrastructure may generate a theme or topic for the pizza delivery data set that comprises "pizza toppings." In some non-limiting exemplary embodiments, upon the creation or establishment of this theme or topic, the artificial intelligence infrastructure may become configured to tag any new or previously-received comments that discuss pizza toppings as being relevant to the pizza topping theme/topic. In some implementations, this may allow the user to quickly identify and review the comments that discuss pizza toppings so that the user may gain insight into what customers think of the restaurant's pizza topping quantity or quality, which may allow the user to make adjustments to the pizza topping preparation in a timely manner, if needed, without having to manually sort through hundreds or thousands of comments to search for relevant information.

In some aspects, a user may have an idea or notion of the type of information that is desired from a data set. In some implementations, the data processing system 100 may be configured to receive at least one input from the user via the computing device 105 in the form of a grouping of one or more words, phrases, numbers, or similar n-grams that describe or represent the type of information that may be desired by the user. By way of example and not limitation, the user input may be entered into a free-form text box, or the user input may be spoken into a microphone, as non-limiting examples. In some embodiments, this may expedite the generation of themes or topics within the data set by reducing the number of steps or iterations that may be needed for topic or theme curation.

As a non-limiting illustrative example, a user may manage a sales team, and the user may want to know the opinions of the team members regarding the workload and weekly scheduling of tasks. In some aspects, the user may solicit feedback comments from all of the sales team members within the organization. In some implementations, the comments may be received by a computing device 105 within a data processing system 100 such that an artificial intelligence infrastructure of the data processing system 100 may be able to access the comments. In some embodiments, the user may use the computing device 105 to enter one or more words, phrases, or numbers that may represent or describe the type of workload or scheduling feedback information that may be sought by the user. By way of example and not limitation, the user may enter words and phrases such as "work-life balance," "project timing," and "weekly pace" to indicate to the data processing system 100 what type of information is wanted.

To further illustrate the previous example, upon receiving the user inputs, the artificial intelligence infrastructure of the data processing system 100 may be configured to parse the sales team comments to identify words and phrases that the artificial intelligence infrastructure perceives to have similar meanings and/or context as the user inputs within the domain of sales employee experiences. In some aspects, by way of example and not limitation, the artificial intelligence infrastructure may identify phrases such as "tight deadlines," "rush projects," and "no breaks" as being frequently used wording that comprises meanings that may be similar or relevant to the user inputs. In some implementations, upon viewing the identified phrases, the user may determine that the overall workload may not be problematic for the team members, but the stress associated with the work may be an issue. In some aspects, this may cause the manager to implement programs designed to help the team members manage stress rather than adjust the amount of work required by the team.

In some non-limiting exemplary embodiments, the data processing system 100 may comprise at least one sentiment analysis tool. In some implementations, the sentiment analysis tool may be integrated with the artificial intelligence infrastructure, or the sentiment analysis tool may comprise one or more coded instructions or algorithms, such as, for example and not limitation, a software application, that may be stored within the storage medium of the computing device 105 and accessed and executed by the processing device thereof, as non-limiting examples. In some aspects, the sentiment analysis tool may be configured to enable the artificial intelligence infrastructure and/or the processing device of the computing device 105 to assess or determine the tone, intent, or emotion associated with each of one or more data items within a data set. By way of example and not limitation, in aspects wherein a data set may comprise a plurality of data items in the form of comments, a sentiment analysis tool may be configured to determine whether the tone of each comment is positive or negative, or whether the author of each comment is expressing feelings of happiness, sadness, or anger, as non-limiting examples. In some implementations, this sentiment determination may enable the data processing system 100 to provide additional structure to data items labeled, tagged, or otherwise sorted into different topics or themes.

In some non-limiting exemplary implementations, once one or more topics or themes have been generated or established for a data set by the artificial intelligence infrastructure of the data processing system 100, the artificial intelligence infrastructure may comprise the ability to quickly determine and output or present one or more statistical or similar data-based summaries of the data set. In some aspects, once at least a portion of the data items within a data set have been tagged or labeled as pertaining to at least one topic or theme, the artificial intelligence infrastructure may be able to quickly determine and output one or more statistics or summaries for that portion of the data set.

By way of example and not limitation, if the data set comprises a plurality of comments comprising customer feedback for a pizza delivery restaurant, upon establishing at least one topic or theme for at least a portion of the comments, the artificial intelligence infrastructure may be able to determine and output that 20% of the comments discuss the delivery driver, 30% of the comments discuss the pizza ingredients, and 70% of the comments about the cheese are negative.

Figure 2:
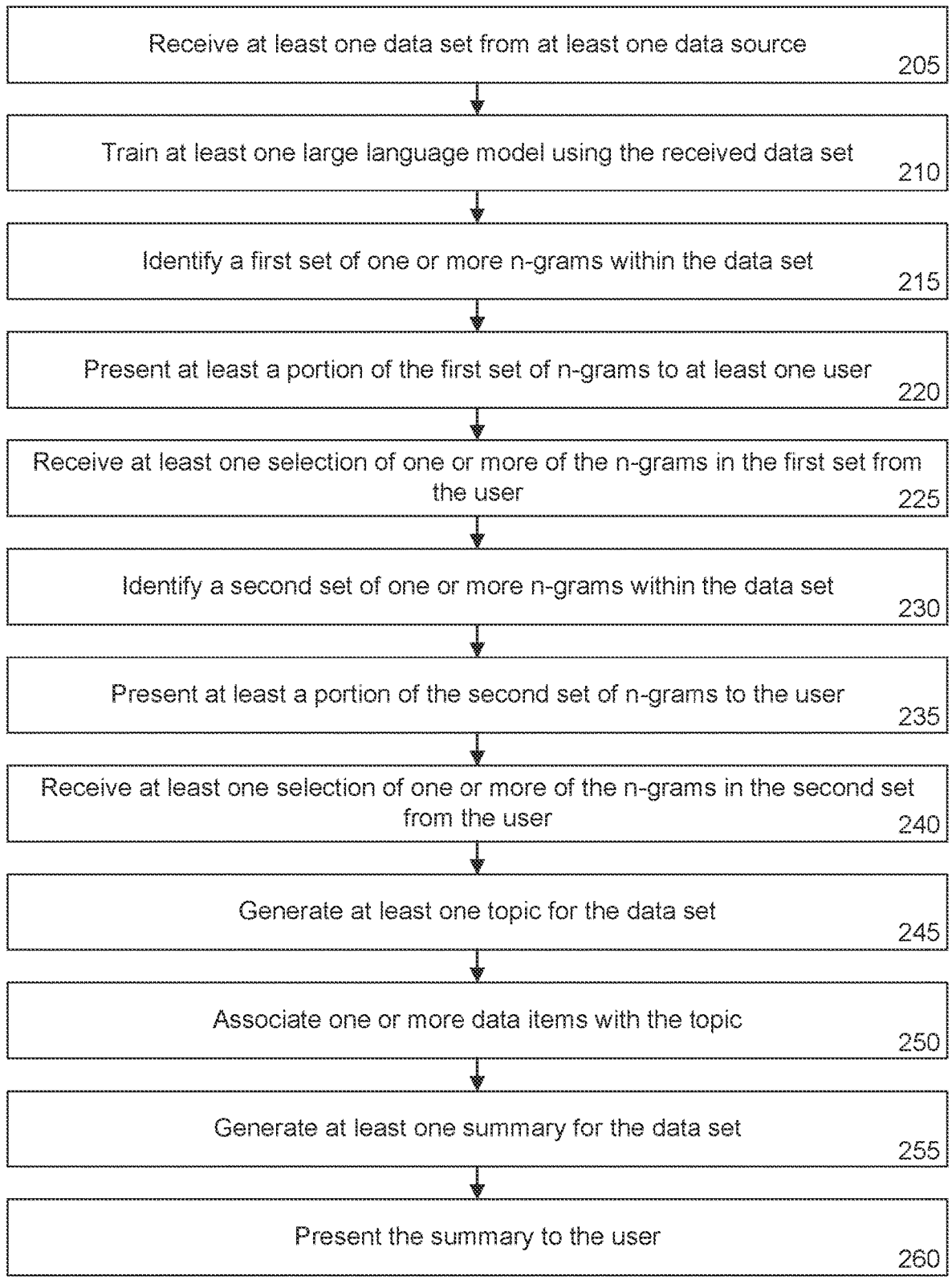
FIG. 2 illustrates exemplary method steps for a process for extracting one or more domain-specific topics from a data set, according to some embodiments of the present disclosure.

Referring now to FIG. 2, exemplary method steps for a process 200 for extracting one or more domain-specific topics from a data set, according to some embodiments of the present disclosure, are illustrated. In some aspects, process 200 may be at least partially facilitated by a data processing system.

In some implementations, at 205, at least one datum of information may be received from at least one data source. In some aspects, the received data may comprise one or more data items within a data set. In some non-limiting exemplary embodiments, each data item may comprise at least one form of natural language text structure, such as, for example and not limitation, a comment or message, as non-limiting examples. In some implementations, the data set may comprise a single domain or two or more substantially similar or closely related domains.

In some aspects, at 210, at least one large language model may be trained using the received data. In some embodiments, the large language model may comprise a neural network or similar artificial intelligence infrastructure. In some non-limiting exemplary implementations, the large language model may be trained exclusively using the data items within the data set such that the domain(s) of the data set may comprise the scope of the context for the large language model. In some embodiments, by limiting the context within which the large language model learns the meaning of words and phrases, the artificial intelligence infrastructure may be trained to develop an accurate understanding of the meaning of the words and phrases within the context of the domain, which may allow the artificial intelligence infrastructure to provide more relevant information regarding identified topics and themes within the data set with a high degree of accuracy.

In some implementations, at 215, one or more frequently used words, phrases, or similar n-grams may be identified within the data set by the artificial intelligence infrastructure. In some embodiments, the high frequency occurrence of the identified n-grams may cause the artificial intelligence infrastructure to regard the n-grams as being potentially important, useful, or relevant to a user's objective or purpose. In some aspects, at 220, at least a portion of the identified n-grams may be presented to at least one user of the data processing system. In some implementations, the n-grams may be presented via at least one display screen or similar mechanism integrated with or communicatively coupled to a user computing device.

In some aspects, at 225, at least one selection of one or more n-grams may be received from the user. In some embodiments, the selection may be received using at least one input device integrated with or communicatively coupled to the user computing device. In some implementations, by way of example and not limitation, the input device may comprise one or more of: a keyboard, a keypad, a touchscreen, a pointing device (e.g., a mouse), a camera, a microphone, an accelerometer, or a motion sensor, as non-limiting examples. In some embodiments, the user may select n-grams that may be most interesting, useful, or relevant to one or more objectives or purposes of the user.

In some non-limiting exemplary implementations, the user may be able to use the computing device to enter one or more words, phrases, or similar n-grams that may describe or represent the type of information the user desires to extract from the data set. In some embodiments, this user input may replace one or more of 215-225, or the user input may supplement one or more of the actions taken at 215-225, as non-limiting examples.

In some implementations, at 230, one or more frequently occurring words, phrases, or similar n-grams within the data set that comprise a similar meaning or similar context as the received user selection(s) may be identified by the artificial intelligence infrastructure. In some aspects, by having developed an understanding of the meanings of words or phrases specific to the context of the domain(s) of the data set, the artificial intelligence infrastructure may have the ability to identify n-grams that may be related in at least one aspect, such as by having a similar meaning within the domain(s) of the data set or by being directed to a similar context within the data set, as non-limiting examples.

As a non-limiting illustrative example, if a first data set comprises a domain that comprises "cameras and photography," the large language model of the artificial intelligence infrastructure may develop an understanding that the term "flash" used in that domain refers to the bright light emitted by a camera when a photograph is taken. However, if the artificial intelligence infrastructure is trained using a second data set that comprises a domain that comprises "package delivery services," the artificial intelligence infrastructure may be trained to recognize that the term "flash" as used in that context may refer to the quick or speedy pace with which a package is delivered. In some aspects, the ability of the trained large language model of the artificial intelligence infrastructure to distinguish between the different meaning of words or phrases within different domains may enable the data processing system to extract and provide data set topics, themes, or other insights that are highly useful, relevant, or interesting to a user.

In some implementations, at 235, at least a portion of the newly identified n-grams may be presented to the user via the user computing device. In some aspects, at 240, at least one selection of the presented n-grams may be received from the user via the user computing device, wherein the user selection may comprise a confirmation that the presented n-grams are relevant to the type of information or data they us desired by the user.

In some non-limiting exemplary embodiments, the portion of process 200 occurring at 230-240 may be iteratively repeated until, at 245, at least one topic or theme is established, curated, or otherwise generated by the artificial intelligence infrastructure. In some aspects, once at least one topic or theme has been established by the data processing system, at 250 one or more new or existing data items within the data set may be tagged, labeled, or otherwise associated with one or more of the established topic(s) or theme(s) such that the user may be able to quickly identify, find, or locate relevant, useful, or interesting data within the data set and, if necessary, implement or initiate one or more actions based on the data.

In some embodiments, at 255, one or more statistics or summaries of the data items within the data set may be determined or generated by the artificial intelligence infrastructure. In some implementations, by having gone through an iterative topic or theme curation process with the user, the artificial intelligence infrastructure may develop an organized structure of the data items within the data set such that the artificial intelligence infrastructure may be able to quickly assess or determine one or more statistics or summaries for the data set. In some aspects, at 260, the statistical or summary information may be presented to the user via the user computing device.

As a non-limiting illustrative example, a data set may comprise a domain that comprises customer reviews of an ice cream shop. In some aspects, an after completing at least one iterative topic or theme curation process with a user, the artificial intelligence infrastructure of the data processing system may generate one topic for the data set that comprises ice cream flavors, a second topic that comprises ice cream toppings, and a third topic that comprises customer service. In some implementations, after these topics have been established by the artificial intelligence infrastructure, the artificial intelligence infrastructure may be able to quickly ascertain from the data set that 20% of the customer reviews discuss the abundance of topping options at the shop, 80% of the reviews discuss a need for more ice cream flavor options, and 55% of the reviews have favorable feedback for the customer service provided at the shop, as non-limiting examples.

Referring now to FIGS. 3A-3B, exemplary user interfaces 300, 301 generated by a data processing system, according to some embodiments of the present disclosure, are illustrated. In some aspects, user interfaces 300, 301 may be generated using one or more coded instructions or algorithms configured within at least one storage medium such that when the coded instructions or algorithms are executed by at least one processing device, the user interfaces may be presented to at least one user via at least one computing device.

In some implementations, the user interfaces 300, 301 may be configured to present different levels of summary information for at least a portion of a data set that has been processed by a data processing system. In some non-limiting exemplary embodiments, the user interfaces 300, 301 may comprise at least one topic or theme summary portion 305, 306 that may provide a visual representation of a frequency with which each topic or theme curated or generated by the data processing system is tagged or labeled within the data set.

In some non-limiting exemplary implementations wherein the data processing system may comprise at least one sentiment analysis tool, the topic or theme summary portion 305, 306 may also comprise a visual indication of a positive or negative sentiment that may be associated with each topic or theme discussed within the data set.

In some aspects, the user interfaces 300, 301 may comprise at least one n-gram summary portion 310, 311. In some implementations, the n-gram summary portion 310, 311 may comprise a visual representation of a frequency with which one or more n-grams occur within a selected topic or theme of the data set. In some non-limiting exemplary embodiments wherein the data processing system may comprise at least one sentiment analysis tool, the n-gram summary portion 310, 311 may also comprise a visual indication of a positive or negative sentiment that may be associated with each n-gram occurrence within the data set.

In some implementations, the user interface 300, 301 may comprise at least one context detail portion 315, 316 that may present the actual natural language context of a selected n-gram within a selected topic or theme within the data set. In some aspects, the different portions 305, 306, 310, 311, 315, 316 presented by the user interface 309, 301 may allow a user to quickly see high level, moderate, and specific information for one or more data items with a data set. By way of example and not limitation, this may allow a user to see a high level summary of all of the topics or themes established for the data set, the frequency of one or more identified n-gram occurrences with each topic or theme, as well as specific instances of each n-gram usage within each natural language comment comment, message, note, or similar textual format.

Figure 4:
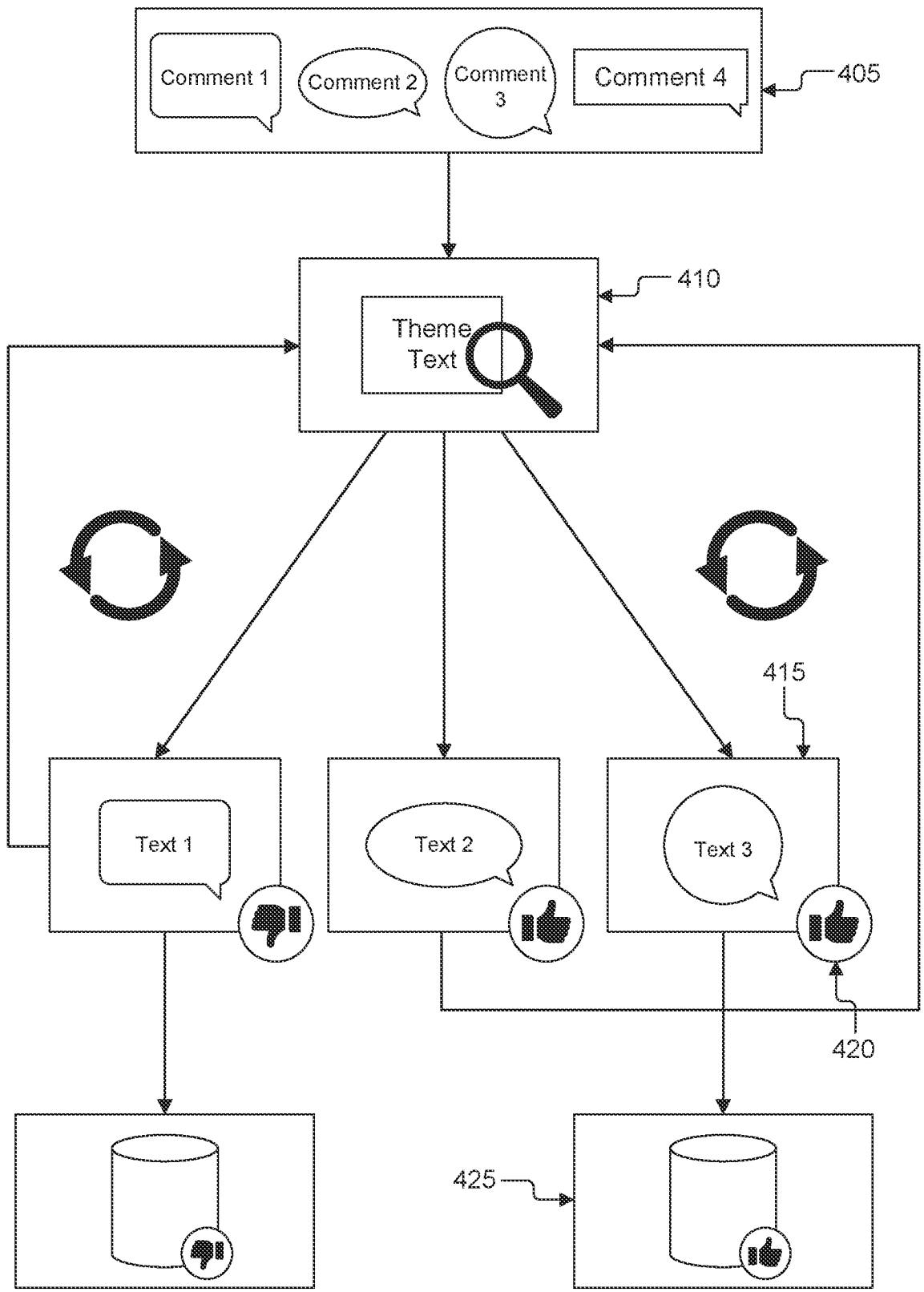
FIG. 4 illustrates an exemplary machine learning process that may be facilitated by a data processing system, according to some embodiments of the present disclosure.

Referring now to FIG. 4, an exemplary machine learning process 400 that may be facilitated by a data processing system, according to some embodiments of the present disclosure, is illustrated. In some aspects, the machine learning process 400 may be used to train at least one artificial intelligence infrastructure of the data processing system.

In some implementations, one or more natural language text formats may be received by an artificial intelligence infrastructure, such as, for example and not limitation, one or more comments 405.

In some non-limiting exemplary embodiments, the artificial intelligence infrastructure may comprise at least one large language model. In some aspects, the large language model may be trained via an unsupervised machine learning process to develop an understanding of the meaning of one or more n-grams user within the comments 405, wherein the large language model may be trained exclusively using the comments 405 within a data set that comprises a single domain or two or more substantially similar domains. In some implementations, this may enable the large language model to develop an accurate understanding of the meaning of the n-grams within the contextual scope of the domain(s) of the data set.

In some aspects, the artificial intelligence infrastructure may search, scan, parse or execute any similar analysis 410 upon the comments 405 to identify one or more n-grams 415 that may comprise, for example and not limitation, text that may be relevant to at least one topic or theme for the data set that may be useful, relevant, or interesting to a user. In some non-limiting exemplary embodiments, the artificial intelligence infrastructure may identify n-grams 415 that may have a relatively high frequency of occurrence within the data set as being potentially relevant to a desired topic or theme.

In some implementations, one or more user inputs may be received by the artificial intelligence infrastructure, wherein each user input may comprise an indication 420 that either confirms the relevancy of an n-gram 415 to a desired topic or theme or rejects the n-gram 415 as being irrelevant or not useful. In some embodiments, any n-grams 415 identified as being relevant to a desired topic or theme may be stored within at least one storage medium 425 and used as a reference to find similar n-grams that may also be relevant to the topic or theme, while any n-grams 415 identified by the user as being irrelevant may be stored without being used to further iterate the topic or theme curation process, as non-limiting examples.

Figure 5A:
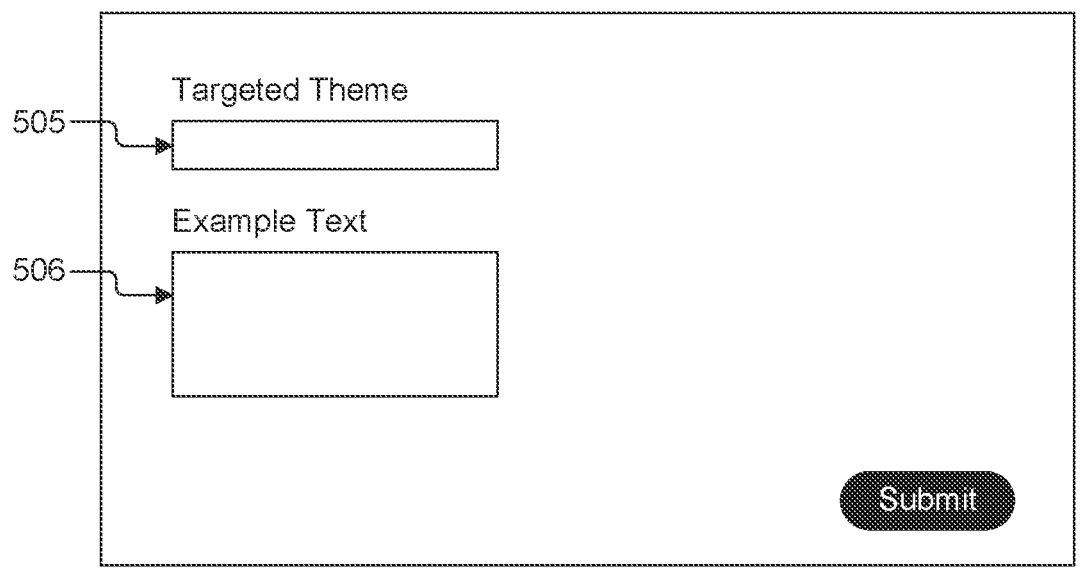
FIG. 5A illustrates an exemplary user interface generated by a data processing system, according to some embodiments of the present disclosure.
Figure 5B:
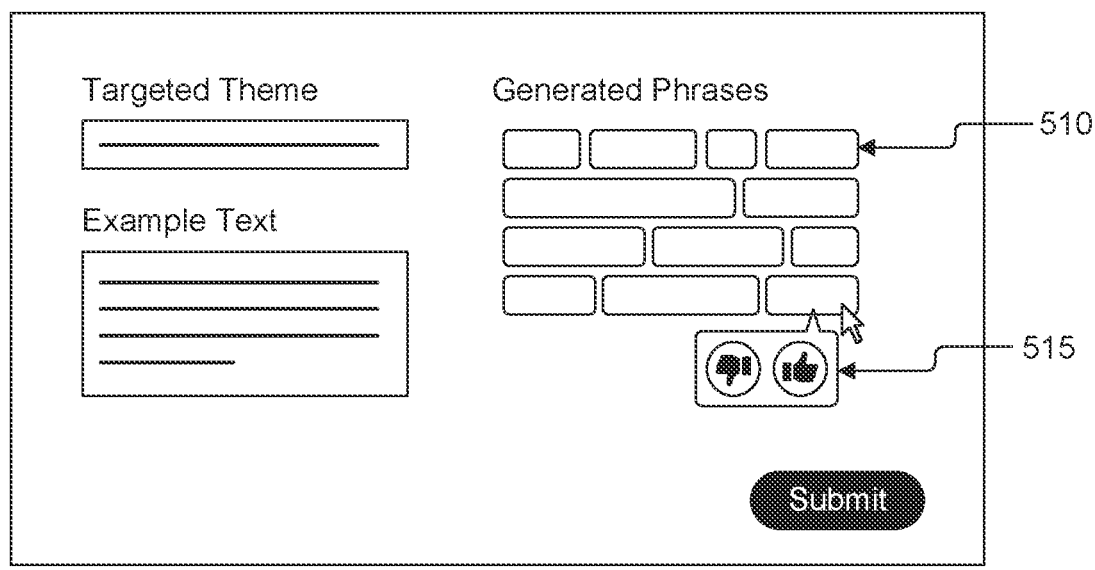
FIG. 5B illustrates an exemplary user interface generated by a data processing system, according to some embodiments of the present disclosure.

Referring now to FIGS. 5A-5B, exemplary user interfaces 500, 501 generated by a data processing system, according to some embodiments of the present disclosure, are illustrated. In some aspects, user interfaces 500, 501 may be generated using one or more coded instructions or algorithms configured within at least one storage medium such that when the coded instructions or algorithms are executed by at least one processing device, the user interfaces may be presented to at least one user via at least one computing device.

In some implementations, the user interface 500 may be generated and presented to allow a user to input at least one n-gram that may describe or represent a desired or targeted topic or theme within a data set. In some non-limiting exemplary embodiments, the user interface 500 may comprise at least one free-form text box 505, 506 within which the user may enter the n-gram(s). In some implementations, the user may use the text box 505 to enter at least one n-gram that describes or represents a targeted topic or theme itself, or the user may use the text box 506 to enter a plurality of n-grams in text form that may briefly describe or illustrate the type of information that may be included within a desired or targeted topic or theme, as non-limiting examples.

In some aspects, the user interface 501 may be generated and presented to allow a user to view one or more n-grams 510, such as, for example and not limitation, words or phrases, that may be identified within the relevant data set by an artificial intelligence infrastructure of the data processing system as being potentially relevant to the user's desired or targeted topic or theme. In some implementations, the user may be able to use the user interface 501 to input one or more indications 515 that may confirm or reject the relevancy of each n-gram 510 identified by the artificial intelligence infrastructure to the desired or targeted topic or theme. By way of example and not limitation, the user may be able to use a pointing device to hover over each n-gram 510 and click to select the applicable indication 515, as a non-limiting example.

Figure 6:
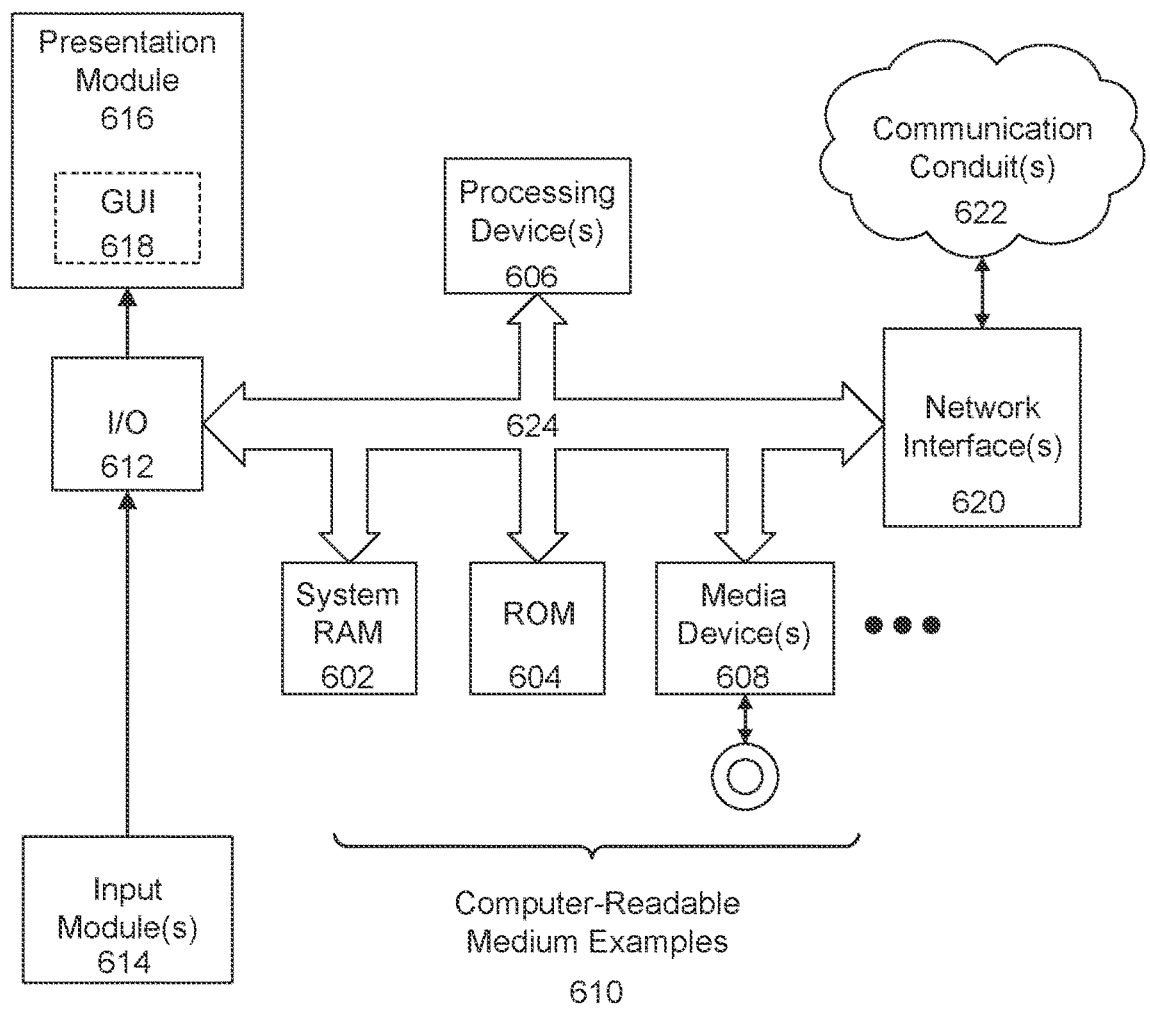
FIG. 6 illustrates illustrates an exemplary computing system that may be used to implement computing functionality for one or more aspects of a data processing system, according to some embodiments of the present disclosure.
Figure 6:
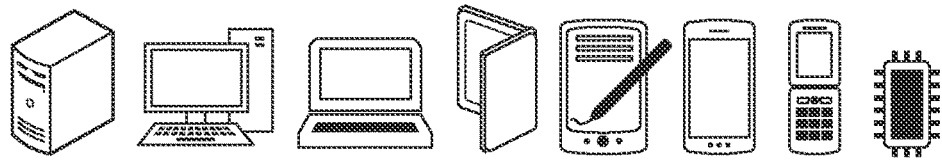

Referring now to FIG. 6, an exemplary computing system that may be used to implement computing functionality 600 for one or more aspects of a data interpretation system, according to some embodiments of the present disclosure, is illustrated. In some aspects, in all cases computing functionality 600 may represent one or more physical and tangible processing mechanisms. Computing functionality 600 may comprise volatile and non-volatile memory, such as RAM 602 and ROM 604, as well as one or more processing devices 606 (e.g., one or more central processing units (CPUs), one or more graphical processing units (GPUs), and the like). Computing functionality 600 also optionally comprises various media devices 608, such as a hard disk module, an optical disk module, and so forth. Computing functionality 600 may perform various operations identified above when the processing device(s) 606 execute(s) instructions that are maintained by memory (e.g., RAM 602, ROM 604, and the like).

More generally, instructions and other information may be stored on any computer readable medium 610, including, but not limited to, static memory storage devices, magnetic storage devices, and optical storage devices. The term "computer readable medium" also encompasses plural storage devices. In all cases, computer readable medium 610 represents some form of physical and tangible entity. By way of example and not limitation, computer readable medium 610 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 602, ROM 604, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of computer readable medium.

Computing functionality 600 may also comprise an input/output module 612 for receiving various inputs (via input modules 614), and for providing various outputs (via one or more output modules). One particular output module mechanism may be a presentation module 616 and an associated GUI 618. Computing functionality 600 may also include one or more network interfaces 620 for exchanging data with other devices via one or more communication conduits 622. In some aspects, one or more communication buses 624 communicatively couple the above-described components together.

Communication conduit(s) 622 may be implemented in any manner (e.g., by a local area network, a wide area network (e.g., the Internet), and the like, or any combination thereof). Communication conduit(s) 622 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "service," "module," and "component" as used herein generally represent software, firmware, hardware, or any combination thereof. In the case of a software implementation, the service, module, or component represents program code that performs specified tasks when executed on one or more processors. The program code may be stored in one or more computer readable memory devices. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method for extracting one or more domain-specific topics from at least one data set, comprising:
receiving at least one data set from at least one data source from a single domain or two or more similar domains, wherein the at least one data set comprises at least one data item that comprises at least one datum;
identifying a first set one or more n-grams within the at least one data set wherein at least one of the one or more n-grams includes a word with a specific meaning within the single domain or the two or more similar domains as opposed to a different specific meaning when the word is used in a different domain, and associating the specific meaning of the word to the word;
presenting the first set of one or more n-grams to at least one user;
receiving at least one selection from the at least one user of at least one of the one or more n-grams; and
generating at least one topic for the at least one data set based at least partially on the received at least one selection.

2. The method of claim 1, wherein the identification of the first set of one or more n-grams and the generation of the at least one topic are at least partially facilitated by at least one artificial intelligence infrastructure.

3. The method of claim 2, wherein the at least one artificial intelligence infrastructure at least partially comprises at least one large language model.

4. The method of claim 3, wherein the at least one large language model is trained via an unsupervised machine learning process.

5. The method of claim 4, wherein the at least one large language model is trained exclusively using the at least one data set.

6. The method of claim 1, wherein the identification of the first set of one or more n-grams is at least partially based on a frequency of occurrence of each of the one or more n-grams within the at least one data set.

7. The method of claim 1, wherein each data set item comprises a comment.

8. The method of claim 1, further comprising:
identifying a second set of one or more n-grams within the at least one data set.

9. The method of claim 8, wherein each of the one or more n-grams in the second set comprises a similar meaning or context as the at least one of the one or more n-grams selected by the at least one user.

10. The method of claim 9, wherein the identification of the second set of one or more n-grams is at least partially based on a frequency of occurrence of each of the one or more n-grams in the second set within the at least one data set.

11. The method of claim 9, further comprising:
presenting the second set of one or more n-grams to the at least one user; and
receiving at least one selection from the at least one user of at least one of the one or more n-grams in the second set.

12. The method of claim 1, further comprising:
generating at least one summary of the at least one data set; and
presenting the at least one summary to the at least one user.

13. The method of claim 12, wherein the at least one summary at least partially comprises at least one statistic.

14. The method of claim 1, further comprising:
receiving at least one input from the at least one user.

15. The method of claim 14, wherein the at least one input comprises a textual description of the at least one topic that is desired by the at least one user.

16. The method of claim 1, wherein the at least one selection received from the at least one user comprises at least one indication.

17. The method of claim 16, wherein the at least one indication comprises a confirmation or rejection of the relevancy of each of the one or more n-grams to the at least one topic.

18. The method of claim 1, further comprising:
tagging one or more of the at least one data item as being associated with the at least one topic.

19. The method of claim 1, further comprising:
receiving an additional at least one selection from the at least one user of at least one of the one or more n-grams;
generating a second topic for the at least one data set based at least partially on the received additional at least one selection; and
tagging one or more of the at least one data item as being associated with the second topic.

20. The method of claim 1, further comprising:
adding a tone to one or more of the at least one data item as being associated with the at least one topic.

* * * * *